(Model.)

P. JORDAN.
Governor for Steam Engines.

No. 238,593. Patented March 8, 1881.

Witnesses
Newell P. Andrus
John Inglis

Inventor
Peter Jordan
John Inglis atty

UNITED STATES PATENT OFFICE.

PETER JORDAN, OF PATERSON, NEW JERSEY.

GOVERNOR FOR STEAM-ENGINES.

SPECIFICATION forming part of Letters Patent No. 238,593, dated March 8, 1881.

Application filed January 5, 1881. (Model.)

*To all whom it may concern:*

Be it known that I, PETER JORDAN, of the city of Paterson, county of Passaic, State of New Jersey, have invented a new and useful Improvement in Governors, of which the following is a specification, reference being had to the accompanying drawings, forming a part thereof.

My invention relates to governors, and has for its object the production of a governor that is more simple in its construction, more effectual in its operation, and one that can be furnished at a lower price than any now in use.

Figure 1:
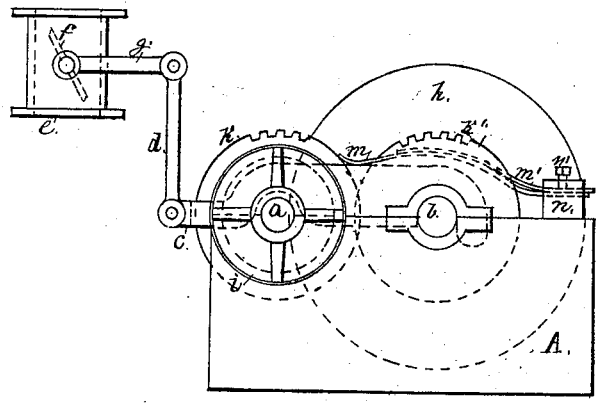
Figure 2:
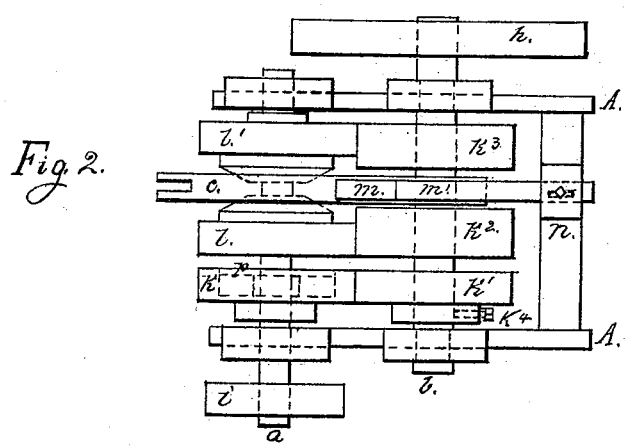
Figure 5:
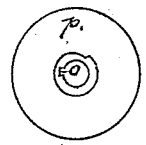
Figure 3:
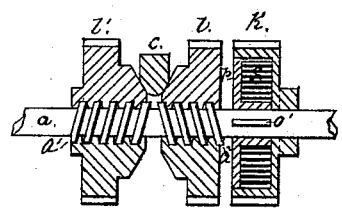
Figure 4:
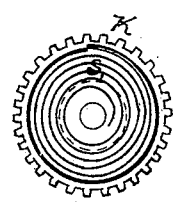

Figure 1 is a side elevation of my newly-invented device. Fig. 2 is a plan view of the same. Fig. 3 is a sectional view of the driving-shaft. Fig. 4 is an inside view of the wheel K, in which there is arranged a spring. Fig. 5 is a view of the plate.

A represents the frame which supports and on which are arranged the various devices, which I will now more fully explain.

On the frame A there is journaled, in suitable bearings, a driving-shaft, $a$, which is provided with a right-hand and a left-hand thread, $a'$ $a^2$, which serves to operate two gear-wheels, $l$ $l'$, which are channeled to correspond with the threads $a'$ $a^2$, and which serve to bring the wheels $l$ $l'$ together or to separate them when required to operate the lever $c$, which opens and closes the throttle-valve $f$, and regulates thereby the speed of the steam-engine or water-wheel, where my device may be in use.

On the shaft $a$ there is arranged a gear-wheel, $k$, which is provided with a spring, $s$, that is arranged on the inside of the rim of the wheel $k$, and which serves to rotate the shaft $b$ at any given rate of speed required by the steam-engine or water-wheel. The wheel $k$ gears with a gear-wheel, $k'$, which is arranged on the shaft $b$. The wheel $k'$ is secured to the shaft $b$ by means of a set-screw, $k^4$. The power of the spring $s$ may be increased or diminished to run the shaft $b$ at any fixed rate of speed by unscrewing the set-screw $k^4$, which allows the wheel $k$ to be rotated to fix the power of the spring $s$, the end of which is in a recess in the wheel $k$, as shown in Fig. 4, and is held in a collar or sleeve at the other end, which is fast to the plate $p$, and has a channel, $o$, that slips over a feather, $o'$, on the shaft $a$, as shown in Figs. 3 and 5. The spring $s$ only rotates the shaft $b$ at its fixed rate of speed. When the steam-engine or water-wheel, for any reason whatever, starts to run faster than the fixed rate of speed, the spring $s$, for the want of power, fails to rotate the shaft $b$ at an increased rate of speed, like the shaft $a$, which causes the wheel $l$ to run on the thread $a^2$, close to the wheel $l'$, which, by the conic form of the sides of the wheels $l$ $l'$, raises the lever $c$, which impinges thereon, and the lever $c$, which connects with the connecting-rod $d$, closes the throttle-valve $f$ by means of the valve-arm $g$.

On the shaft $b$ there is arranged a wheel, $k^2$, which gears with the wheel $l$, also a wheel, $k^3$, that gears with the wheel $l'$, both of which, by reason of a want of power in the spring $s$ to rotate the shaft $b$ faster than its fixed rate of speed, cause the wheels $l$ $l'$ to run together by reason of the refusal of the shaft $b$ to increase its speed and thereby raise the lever $c$ and close the valve $f$, as before stated.

By reason of the driving-shaft $a$ continuing to run at an increased rate of speed it raises the lever $c$ at once, which increases somewhat the power of the spring $s$, and would make the shaft $b$ run somewhat faster and open the valve $f$ before it was necessary, if it were not that the lever $c$ bears more heavily on the shaft $b$ by reason of the power of the action of the spring $m$ on the lever $c$. When the shaft $a$, by reason of the closing of the valve $f$ by the action of the wheels $l$ $l'$ on the lever $c$, is brought back to its fixed rate of speed, the wheels $l$ $l'$ open, and the lever $c$ is pressed down by the action of the spring $m$, the lever $c$ rests, as before, on the shaft $b$, and the spring $s$ returns to its fixed tension or power, and the shafts $a$ and $b$ run at their regular and fixed rates of speed. Above the spring $m$ there is arranged a spring, $m'$, the object of which is to increase the power of the spring $m$ at any given point when required. The springs $m$ $m'$ are provided with a slot, and are held by a set-screw, $n'$, and can be moved backward and forward at pleasure. The driving-shaft $a$ is provided with the ordinary driving-pulley $i$.

My invention is particularly adapted for steamships, as it acts very promptly and powerfully.

What I claim as new, and desire to secure by Letters Patent in a steam-engine governor, is—

1. The combination of the gear-wheels $l$ $l'$, threads $a'$ $a^2$, lever $c$, springs $m$ $m'$, bar $n$, set-screw $n'$, connecting-rod $d$, arm $g$, valve $f$, and shaft $a$, all arranged as shown and set forth.

2. The combination of the wheels $l$ $l'$, wheel $k$, spring $s$, plate $p$, sleeve $o$, feather $o'$, wheel $k'$, wheel $k^2$, wheel $k^3$, shaft $b$, wheel $h$, shaft $a$, set-screw $k^4$, and frame A, all arranged as shown and set forth.

PETER JORDAN.

Witnesses:
JOHN INGLIS,
NEWELL P. ANDRUS.